United States Patent [19]
Potzick et al.

[11] Patent Number: 4,520,320
[45] Date of Patent: May 28, 1985

[54] SYNCHRONOUS PHASE MARKER AND AMPLITUDE DETECTOR

[75] Inventors: James E. Potzick, Potomac; Baldwin Robertson, Bethesda, both of Md.

[73] Assignee: The United States of America as represented by the Secretary of Commerce, Washington, D.C.

[21] Appl. No.: 571,288

[22] Filed: Feb. 22, 1984

Related U.S. Application Data

[62] Division of Ser. No. 300,830, Sep. 10, 1981, Pat. No. 4,445,389.

[51] Int. Cl.³ .................... H03K 9/06; H03K 5/22; H03K 5/24
[52] U.S. Cl. .................... 328/133; 307/520; 307/529; 307/356; 328/146
[58] Field of Search ............ 328/133, 134, 162, 165, 328/148, 149, 146, 147; 307/520, 525, 526, 529, 359, 356, 350, 354, 527, 358, 240, 514, 516

[56] References Cited

U.S. PATENT DOCUMENTS

| | | | |
|---|---|---|---|
| 3,122,704 | 2/1964 | Jones | 328/134 |
| 3,164,777 | 1/1965 | Guanella | 328/134 |
| 3,588,734 | 6/1971 | Welti | 307/516 |
| 3,737,790 | 6/1973 | Brown | 307/359 |
| 3,758,868 | 9/1973 | Brown | 307/359 |
| 3,764,924 | 10/1973 | Caplan et al. | 328/134 |

OTHER PUBLICATIONS

Robertson et al., "Synchronous Marker for Measuring Phase in the Presence of Noise", Rev. Sci. Instrum., vol. 48, No. 10, Oct. 1977, pp. 1290-1294.
Potzick et al., "Voltage-Controlled Phase Shifter for Measuring Transfer Function in the Presence of Noise," Rev. Sci. Instrum., vol. 52, No. 2, Feb. 1981, pp. 280-286.

Primary Examiner—Stanley D. Miller
Assistant Examiner—Timothy P. Callahan
Attorney, Agent, or Firm—Eugene J. Pawlikowski; Alvin J. Englert; Stanley C. Spooner

[57] ABSTRACT

Disclosed is an electronic circuit for determining the phase difference between an input signal and a reference signal where both signals are of the same frequency. Furthermore, the circuit provides an amplitude output indicative of the input signal even when that signal is obscured by noise. A chopper is supplied with the obscured signal input and a reference signal input and provides an output to an integrator which provides a control voltage for a voltage controlled phase shifter which supplies an out of phase input to the chopper. The input to the voltage controlled phase shifter is of the same frequency as the signal obscured by noise. A further output of the voltage controlled phase shifter is 90° out of phase with respect to the reference supplied to the chopper and thus is in phase with the signal obscured by noise and provides the desired marker output. This marker output is also supplied as a reference to a second chopper which is also supplied with the obscured signal as an input. The output of the second chopper after suitable amplification, is proportional to the amplitude of the signal that is buried in noise. Thus, as long as the frequency of the signal buried in noise is known and supplied in the form of a reference signal, the phase and amplitude of the signal can be determined with the synchronous phase marker and amplitude detector.

3 Claims, 9 Drawing Figures

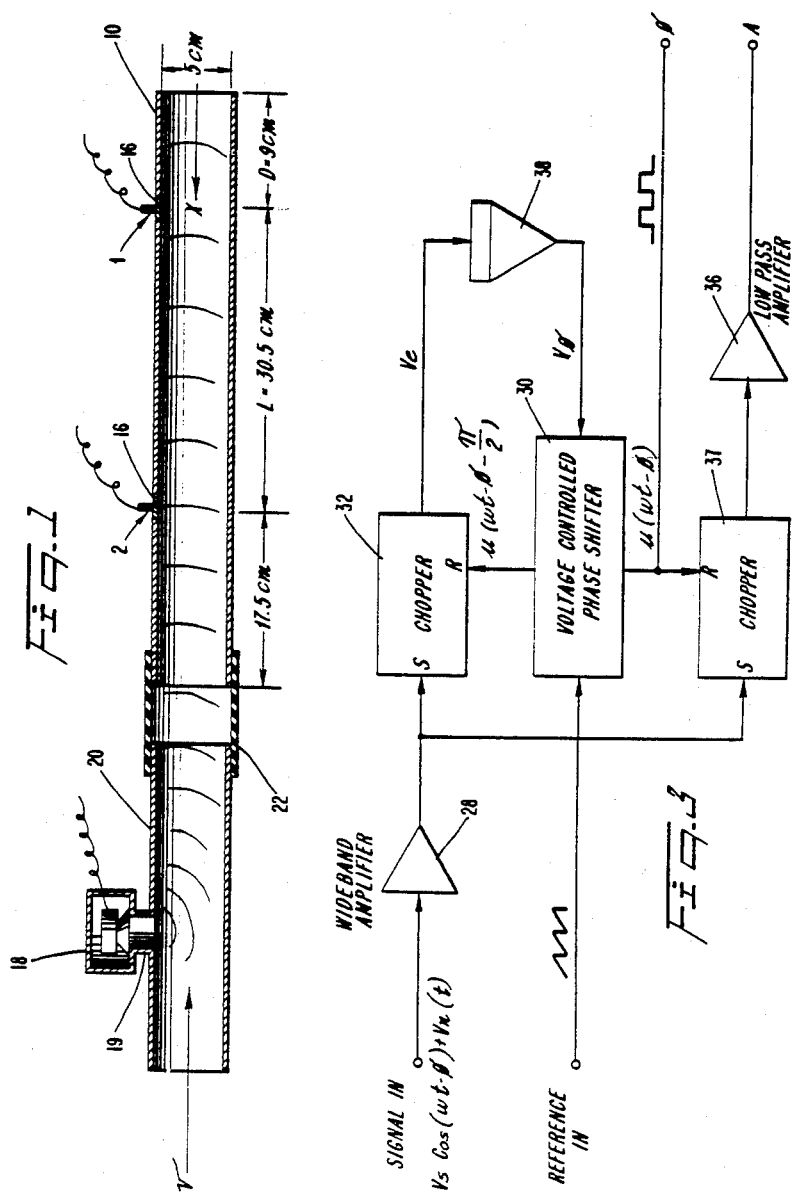

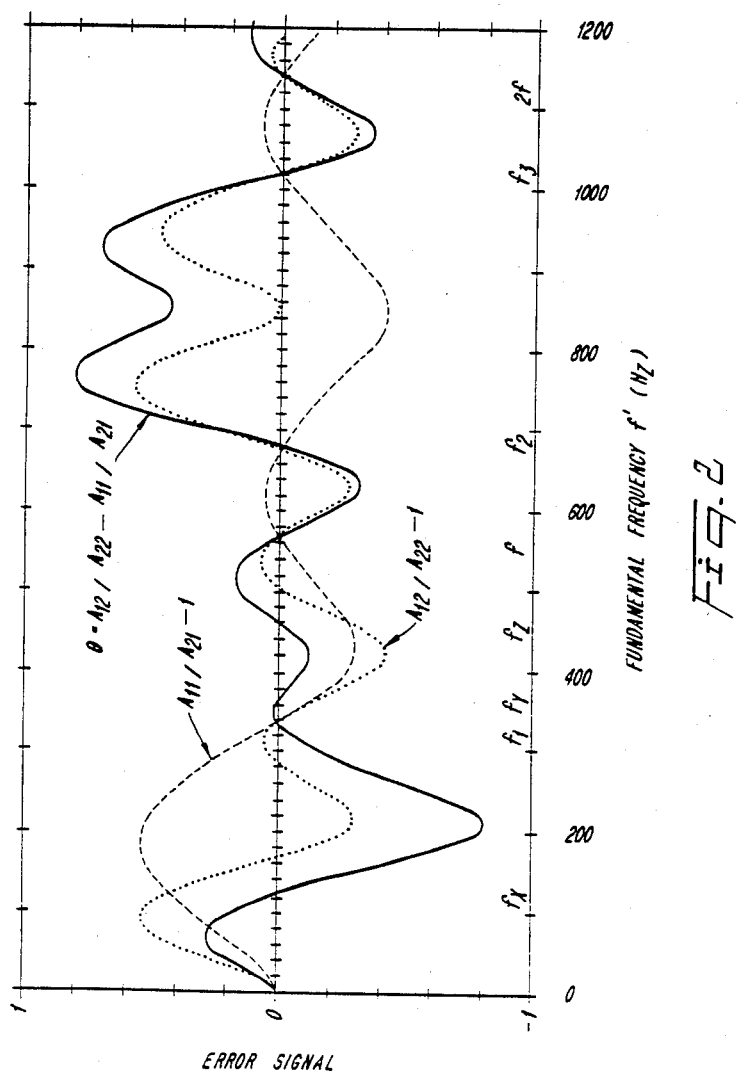

SYNCHRONOUS PHASE MARKER AND AMPLITUDE DETECTOR

This is a divisional of Ser. No. 300,830, filed Sept. 10, 1981, now U.S. Pat. No. 4,445,389 issued May 1, 1984.

BACKGROUND OF THE INVENTION

The present invention relates generally to flowmeters for measuring volume flowrate in flowing fluids and to instruments for measuring the mass flowrate, temperature and density of flowing fluids. It relates specifically to methods of and instruments for using acoustical techniques for accomplishing these measurements in a pipe and a circuit for detecting amplitude and phase of a singal buried in noise.

The increased interest in reducing automotive emission of atmospheric pollutants has given rise to a need for a flowmeter to measure the volume flowrate of exhaust flow from the tailpipe. This flowmeter can be used with pollution concentration detectors to obtain the total pollutant mass flowrate from a tailpipe on automotive production lines and in state and local test stations to determine commpliance with Environmental Protection Agency (EPA) regulations. Additional applications for such a flowmeter include the measurement of engine intake or exhaust flowrates and temperatures for the development of fuel-efficient engines of either the reciprocating or turbojet kind. Still further applications include measuring the flow of natural gas or steam in a pipe or the flow of human or animal breath.

A requirement for an automotive exhaust flowmeter is that it be nonintrusive to the extent that it introduce a backpressure less than 500 pascals (Pa). (1 Pa=1 Newton/square meter, 1 standard atmosphere=101,325 Pa.) Also, the exhaust temperature can vary rapidly over a large range up to 260° Celsius, and the wide-band noise level in the tailpipe may be as high as 145 db. It is desirable to be able to respond to changes in the flow rate very quickly (within a few milliseconds).

Prior art nonintrusive ultrasonic flowmeters are described in a paper by L. C. Lynnworth entitled "Ultrasonic Flowmeters" published in "Physical Acoustics" (Academic Press, 1979, Vol. 14, pp. 407–525) which contains a comprehensive list of references. The only acoustic flowmeters that have a chance of working properly in the presence of high levels of broadband noise use substantially continuous waves and narrow-band or high-Q transducers and/or subsequent electronic filters. Typical flowmeters of this kind are disclosed in U.S. Pat. Nos. 4,003,252 to Dewath; 4,011,755 to Pederson, et al.; and 4,164,865 to Hall, et al. All of the prior art acoustic flowmeters use waves whose wavelength is shorter than the cutoff wavelength of the conduit which is defined for a circular pipe as 1.706 times the pipe diameter, and for other conduits as $2\pi$ times the square root of the next to lowest eigenvalue for the Helmholtz equation in that geometry.

For such short wavelengths, spatial acoustic modes of higher order than the fundamental will propagate in the pipe along with the fundamental mode. These higher modes will be unavoidably generated by reflection of the sound by bends, elbows, and other obstructions that occur in all piping systems. If these modes are permitted to propagate into the region where the flow measurement is carried out, their superposition with the fundamental mode will be detected there as a single sound wave that is sinusoidal in time. The phase of this wave will depend on the phases and amplitudes of all of the modes in the sum (the higher order modes as well as the fundamental one). Unavoidable temperature variations in the flowing gas will cause these phases and amplitudes to vary in an extremely complicated way. Thus, the detected phase difference cannot be related to the flowrate without using a detailed knowledge of the time dependence of the temperature distribution. This dependence is not available; and, even if it were, the relation would be impractically difficult. As a result, the flowrate indication will drift unpredictably when the temperature of the gas is not constant.

In an effort to prevent the higher spatial modes from interfering with the flow measurement, prior art continuous-wave flowmeters use sound absorbing material in the transducer assembly, e.g., those disclosed in Dewath and Hall, et al., previously noted. Available materials may be expected to reduce the reflected wave amplitude by at most a factor of ten or so from the incident amplitude. The result will be an offset in the flow indication that varies unpredictably even with the small temperature changes that are typical in an instrument in an air conditioned room. This will limit the accuracy of the flow measurement even more in less demanding applications. The situation is much worse for the intended applications where the temperature excursions are much larger and the effectiveness of the sound absorber may be destroyed. Therefore, no prior art instrument is capable of performing the required gas flow measurements in a pipe.

Another desirable characteristic of a flowmeter is that it gives a flow indication that is independent of flow profile. U.S. Pat. No. 4,078,428 to Baker, et al., discloses a flowmeter that is intended to give a total mass flow indication that is independent of whether the profile is laminar or turbulent. However, the method used depends on the flow being fully developed and the profile having a particular mathematical form. Hence, this prior art flowmeter is not accurate for nonaxisymmetric flows that may occur, e.g., resulting from bends, elbows, or valves upstream.

Additionally, there is a need in the petroleum and chemical process industries for measuring flowrates and relative fractions in flowing liquid-liquid mixtures, liquid-gas mixtures, particle-liquid mixtures or slurries, and particle-gas mixtures. An example of a prior art instrument intended for the first of these applications is disclosed in U.S. Pat. No. 4,080,837 to Alexander, et al. This prior art instrument is intended to measure water content in an oil-water mixture and determine the flowrate. To reduce droplet size, it uses a mixer consisting of a plurality of tortuous flow routes, which cause a substantial pressure drop. Without the mixer, the droplets would be so large that the ultrasonic beam used in the prior art instrument would not be able to get across the pipe and the instrument would not operate at all. This difficulty exists with all short wavelength prior art acoustic flowmeters used on any multiphase or multicomponent flow.

SUMMARY OF THE INVENTION

It is, therefore, an object of the present invention to provide an instrument capable of accurately measuring the average flow velocity or volume flowrate of an arbitrary fluid, e.g., a gas, a liquid or a multiphase or multicomponent fluid, flowing in a conduit, the average being taken over the interior of the conduit pipe.

It is an additional object of the present invention to measure amplitude and phase of a signal that is buried in noise when the frequency of the signal is known.

It is a further object of the present invention to accurately measure the average speed of sound in an arbitrary flowing fluid, the sound speed being that of the same fluid as if it were stationary.

It is a still further object of the present invention to generate sound in an arbitrary fluid of a specified wavelength, even though the speed of sound in the fluid is varying rapidly in space and time.

It is a further object of the present invention to accurately measure the total mass flowrate, average density, and average temperature of a flowing, approximately perfect gas or gas mixture, given the average specific heat ratio, the pressure, and the average molecular weight.

It is an additional object of the present invention to provide an absolute measurement of mass flowrate, average density and average temperature of a flowing gas, i.e., without requiring calibration.

It is a further object of the present invention to provide an accurate measurement of all these quantities, independent of the flow, sound speed, and temperature distributions or profiles across the conduit.

It is still a further object of the present invention to nonintrusively measure all of the above quantities, i.e., the instrument has no protuberances or cavities that disturb the flow.

It is an additional object of the present invention to accurately measure the above quantities in a relatively high noise environment.

It is a further object of the present invention to provide a bidirectional flow measurement, i.e., giving a signed flow indication.

The above and other objects are achieved by using a long wavelength acoustic technique where the wavelength is longer than the cutoff wavelength of the conduit. A loudspeaker or other sound source is connected to a conduit through which the fluid to be measured is flowing. Displaced from the loudspeaker some distance away, two small broadband microphones or pressure transducers are mounted in the wall of the same pipe, tube or duct. These may be mounted with their diaphragms flush with the inner wall surface so that the surface presented to the flowing fluid is smooth and without protuberances or cavities. One microphone is placed further from the loudspeaker than the other a distance which, in the case of a circular conduit, may be six pipe diameters or more. For a noncircular conduit, comparable spacing is used. This spacing can be varied by using a telescoping pipe, tube or duct. In any event, the spacing chosen is an integral multiple of one-half the wavelength of the sound to be generated.

In a preferred embodiment, the loudspeaker generates sound that is the superposition of sine waves at two frequencies, one twice the other, such that the wavelength of the higher frequency component equals the distance between the microphones. The instrument accomplishes this by measuring the sound amplitude at each microphone and for each frequency, computing the ratio of amplitudes from the two microphones for each frequency, and subtracting the ratio at one frequency from the ratio at another to obtain an error signal. The error will vanish when the shorter wavelength equals the distance between the microphones. The error is integrated, and the integral is used to set the frequency of an oscillator that, along with a frequency divider, generates the two frequencies used to drive the loudspeaker. Once the frequencies are set correctly, the instrument measures the difference in phase of the signal detected by each microphone at each frequency. The phase differences and the frequency are used to obtain the above described quantities.

BRIEF DESCRIPTION OF THE DRAWINGS

A more complete appreciation of the invention and the attendant advantages thereof will be more clearly understood by reference to the following drawings wherein:

FIG. 1 is a longitudinal sectional view of an open-ended embodiment of the meter-tube assembly used in the present invention;

FIG. 2 is a graph showing three possible error signals versus frequency;

FIG. 3 is an electrical block diagram of the synchronous phase marker and amplitude detector (SPMAD);

DETAILED DESCRIPTION

Figure 4:
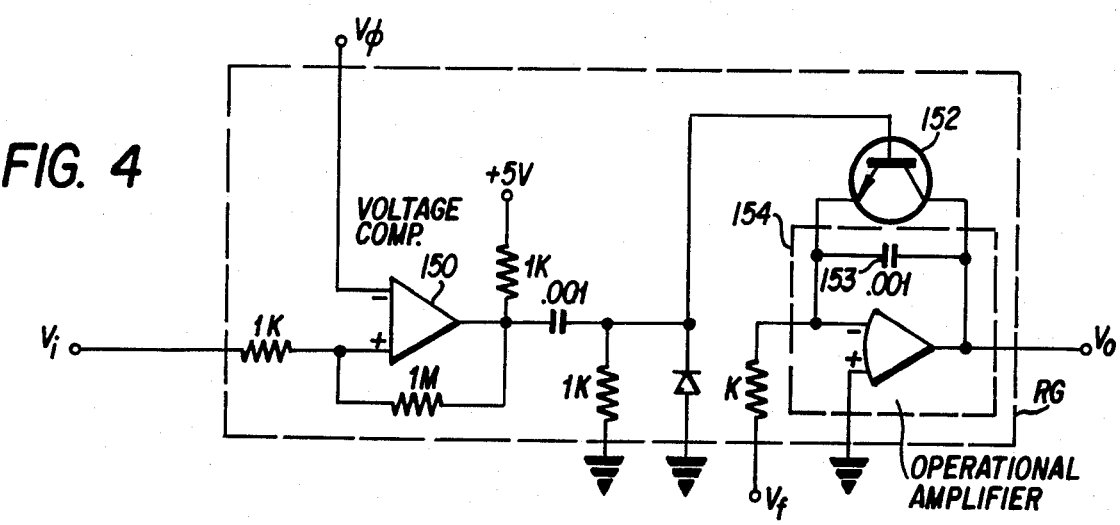
FIG. 4 is an electrical schematic of a ramp generator (RG) circuit used in FIG. 5.

In order to overcome the problems noted with regard to the prior art's using of short wavelengths, it has been found that a wavelength much longer than the cutoff wavelength of the conduit is helpful. For such wavelengths, only one mode will propagate, the fundamental or plane-wave mode. In an instrument that uses only these longer wavelengths, there is no possibility of higher modes causing errors. The instrument will indicate the total flowrate and the gas temperature averaged over the interior of the meter tube. The accuracy of the measurements will be independent of the flow and temperature profiles in the pipe and hence independent of upstream piping configurations.

The present invention shows a substantial advantage when there are droplets or particles in the fluid. Since the wavelength is very large compared with the size of the droplets or particles, scattering does not prevent the sound from getting through, and the instrument will operate without using a mixer, which would cause a large pressure drop. As with single-phase flow, the present invention will measure the average volume flowrate of the composite fluid and the average speed of sound in it. These measurements can be interpreted semiempirically, based on prior calibration with the particular mixture of interest, in order to obtain the desired quantities, such as mass flowrate and relative fraction, without introducing a pressure drop.

Referring now to the drawings wherein like reference characters designate like parts throughout the several views, FIG. 1 shows the meter tube 10 of a preferred embodiment having first and second receiving means comprising microphones 1 and 2 mounted in the wall, preferably with their diaphragms flush with the inner surface of the wall. To insulate the microphones from vibrations passing along the tube itself, the microphones may be mounted in an elastic material 16. The tube may be made of 3 mm thick brass with an inner diameter of 5 cm, and the microphones are spaced 30.5 cm apart. The terms tube, pipe, duct and conduit are used herein to indicate any means for conveying a fluid flow regardless of cross-section. A means for producing acoustic waves comprises a loudspeaker 18 directly coupled to a branch 19 of the tube 20 at a location 50 cm upstream of the upstream microphone. In order to prevent the brass wall of the tube 20 itself from transmitting sound directly to the microphones, a rubber vibration isolation coupling 22 may be used to connect the meter tube 10 to the tube 20 on which the loudspeaker is mounted.

The loudspeaker generates sound consisting of a superposition of two sinusoidal waves at frequencies f and 2f. The frequency is chosen so that 2f is substantially less than the cutoff frequency of sound in the meter tube. When the waves reach the microphones, the cutoff spatial modes will have decayed nearly to zero and only the fundamental waves in the form of plane waves will be present. In the embodiment of FIG. 1, the downstream traveling waves are reflected from the open end of the meter tube 10 with a small decrease in amplitude. The downstream microphone may be spaced 9 cm from the open end of the meter tube 10 so that the sound amplitude at each frequency is satisfactorily large at each microphone, at least when the wavelengths are nearly correct.

In another similar embodiment to be used in a closed piping system, the downstream traveling waves will be reflected by the bends and elbows that always occur in closed piping systems. In this embodiment, the locations of the microphones are chosen so that the sound will have a satisfactorily large amplitude at the microphones. This can always be done since, if the sound waves are not large enough at one pair of locations, they will be large enough if the locations are translated upstream or downstream some distance less than one-quarter wavelength. For either embodiment, the region between the microphones will contain plane waves traveling in both directions such that the microphones are not near nodes for either frequency.

The flowing fluid affects the sound velocity so that the average propagation velocity c of the sound is decreased in the upstream direction and increased in the downstream direction in the amount of the average velocity v of the fluid. The averaging occurs because the sound wavelength is long compared with the diameter of the tube. We are not able at present to describe the precise character of the averaging except for a single-phase fluid. Still, it is certainly quite apparent that the long wavelength technique can measure averages taken over the entire meter tube between the two microphones.

To simplify exposition, we describe only the effects associated with the components at a single angular frequency $\omega$, which later in our discussion can be chosen to equal either $2\pi f$ or $4\pi f$. Thus, for the present, the acoustic pressure field can be considered to comprise two terms, one for the upstream traveling wave and one for the downstream wave. The propagation velocities in these terms equal the average sound speed c decreased or increased, respectively, by the average fluid velocity v. The voltage from a wideband microphone is proportional to the acoustic pressure, and hence is given by:

$$V = A_u \cos\left(\omega t - \frac{\omega x}{c - v} + \phi_u\right) + A_d \cos\left(\omega t + \frac{\omega x}{c + v} + \phi_d\right) \quad (1)$$

where $A_u$ and $A_d$ are the voltage amplitudes due to the upstream and downstream traveling waves, $\phi_u$ and $\phi_d$ are the corresponding phases, and x is the position of the microphone, with x increasing in the upstream direction.

Consider the open-ended embodiment of FIG. 1. Let the end of the pipe be at $x=0$. Now the effective end of the pipe is located a small distance l (the end correction) outside the end of the pipe. Thus, the downstream traveling wave is reflected at $x=-l$. After reflection, it becomes:

$$A_u \cos\left(\omega t + \frac{\omega l}{c - v} + \phi_u\right) = -R A_d \cos\left(\omega t - \frac{\omega l}{c + v} + \phi_d\right) \quad (2)$$

where R is the magnitude of the reflection coefficient, which satisfies $0 < R < 1$. Both R and the end correction $kl = \omega l/c$ are determinable in the literature for both flanged and unflanged circular pipes. The absolute phase, which has no physical significance, can be specified by choosing the time origin so that $\phi_u + \phi_d = 0$. If we let $A_d = A > 0$, the last equation gives $A_u = -RA$ and:

$$\phi_d = -\phi_u = \frac{\omega c l}{c^2 - v^2} \quad (3)$$

The same formulas can be used for the embodiment intended for a closed piping system. Here R and l effectively parameterize the amplitude and phase at the meter tube of the plane wave that results from sound reflection by bends and elbows downstream of the meter tube.

With these results, trigonometric identities can be used to reduce the expression for the microphone signal to:

$$V = A(x) \cos[\omega t + \phi(x)] \quad (4)$$

where the amplitude is:

$$A(x) = A\sqrt{1 - 2R \cos\left(2\omega c \frac{x + l}{c^2 - v^2}\right) + R^2} \quad (5)$$

and the phase is $$\phi(x) = \tan^{-1}\left[\frac{R + 1}{R - 1} \tan\left(\omega c \frac{x + l}{c^2 - v^2}\right)\right] - \frac{\omega v x}{c^2 - v^2} \quad (6)$$

Thus, the signal from a microphone is sinusoidal with an amplitude and phase that depends among other things on the average wavelength $2\pi c/\omega$ and on the average velocity v.

For the above, we have not considered the frequency dependence of the coefficient $A_d$. Resonances in the piping system and the loudspeaker will cause $A_d$ to depend strongly on frequency. However, the ratio of amplitudes at the two microphones will be independent of actual amplitude and will have a smooth frequency dependence. If one microphone is at $x=D$ and the other at $x=D+L$, then the ratio of the amplitude of the downstream microphone to that of the upstream one is:

$$\frac{A(D)}{A(D+L)} = \sqrt{\frac{1 - 2R\cos\left(2\omega c\frac{D+l}{c^2-v^2}\right) + R^2}{1 - 2R\cos\left(2\omega c\frac{D+L+l}{c^2-v^2}\right) + R^2}} \quad (7)$$

A portion of the instrument, which is a means for insuring that spacing L is an integral multiple of one-half the specified wavelength, computes this ratio or its square and uses it to adjust the operating frequency f. When the frequency is set to the correct operating point, the average flow velocity and average flowrate are proportional to the phase difference.

The operating frequency may be set by requiring the ratio be equal to 1, which occurs when the frequency satisfies:

$$f = \frac{c^2 - v^2}{2Lc} \quad (8)$$

with either $\omega=2\pi f$ or $\omega=4\pi f$. This makes the argument of the cosine in the denominator larger than the argument in the numerator by $2\pi$ or $4\pi$, respectively, so that the ratio is 1 in both cases. A better method used in a preferred embodiment involves sound of the two frequencies, f and 2f, superposed, i.e., generated together by the loudspeaker. Here, the fundamental frequency f is obtained by dividing the frequency 2f digitally by 2. The instrument adjusts these frequencies to make the amplitude ratios at the two frequencies merely equal to each other rather than both equal to 1. This eliminates any error in setting the operating frequency due to changes in the sensitivity of either microphone or either microphone amplifier.

If the first subscript 1 or 2 denotes the downstream microphone 1 or upstream microphone 2, respectively, in FIG. 1, and the second subscript 1 or 2 denotes the frequencies 1f or 2f, respectively, the error signal is used in the analog embodiment to be described is the difference of ratios:

$$\epsilon = \frac{A_{12}}{A_{22}} - \frac{A_{11}}{A_{21}} \quad (9)$$

This can be computed from equation (7) by using $\omega=2\pi f$ for the first ratio and $\omega=4\pi f$ for the second. In the digital embodiment to be described, the error signal is the difference in the squares of the ratios (in equation (7)) for the two frequencies. This difference equals the sum of the ratios (in equation (7)) for the two frequencies, multiplied by the difference (in equation (9)). Since the sum of ratios is approximately equal to 2; the two error signals are nearly proportional to each other. In either embodiment, if one microphone or amplifier sensitivity changes, then both numerators or both denominators will change by the same factor, and the error signal will still be zero at the correct operating frequency.

The error signal of equation (9) is graphed in FIG. 2 (solid line) as a function of the fundamental frequency f' generated by the loudspeaker. Also shown in FIG. 2 are graphs of the ratio in equation (7) minus one for frequency f' (dashed line) and frequency 2f' (dotted line), both as a function of the fundamental frequency f'. The correct operating frequency is the frequency labeled f at which all three curves cross zero. Other frequencies at which all these cross zero are labeled $f_1$, $f_2$ and $f_3$. By using equation (8) to eliminate $c^2-v^2$ from equation (7), one can show that these frequencies are given by:

$$f_1, \frac{f_2}{2}, \frac{f_3}{3} = \frac{Lf}{2D+L+2l} \quad (10)$$

These equations should be used with some caution, since the end correction l depends on f', i.e., on $f_1$, $f_2$ and $f_3$, in the three equations, respectively. Thus, the three frequencies are not exactly in the ratio 1, 2, 3, although they are very nearly so, since 2l is small compared with 2D+L. Still, other frequencies at which equation (9) crosses zero are labeled $f_X$, $f_Y$ and $f_Z$. These zero crossings occur because the two ratios in equation (9) are equal to each other, even though they are not equal to 1. Elimination of $c^2-v^2$ in equation (7) by use of equation (8) shows that $f_x=Xf$, $f_y=Yf$ and $f_z=Zf$, where the coefficients X, Y and Z are transcendental functions of R and (D+l)/L evaluated at the frequency involved.

The error signal $\epsilon$ crosses zero once in the interval $f_z<f'<f_2$. Thus, provided f' starts in this range, integral feedback can easily be used to set f'=f. In the analog embodiment of FIG. 4, the time integral of the error $\epsilon$ is fed to the voltage input of a voltage-controlled oscillator. In the digital embodiment of FIG. 7, the error $\epsilon$ is added by software to the BCD frequency input of a digitally controlled oscillator. For both embodiments, the result is that, if $f_z<f'<f$ then f' will increase until it equals f, and, if $f<f'<f_2$, then f' will decrease until it equals f.

For the embodiment of FIG. 1 in which the distance L between microphones is fixed at 30.5 cm, the zero-velocity operating requency f given by equation (8) for dry air will be 544 Hz at 0° C., 563 Hz at 20° C. and 660 Hz at 130° C. Thus, when the flowmeter is operating correctly, the tone can be heard to increase steadily as the temperature of the flowing gas is raised. For the 563 Hz operating frequency that is correct for 20° C., the lower frequency $f_z$ is 462 Hz, and the upper frequency $f_2$ given by equation (10) is 666 Hz, since l=1.55 cm at that frequency.

Since the operating frequency f changes with temperature, the range within which f' should be constrained for integral feedback to work must be somewhat smaller than the interval from 462 to 667 Hz. This is necessary because, when f changes with changing temperature, so also do $f_z$ and $f_2$. The frequency limits must be fixed narrowly enough for the feedback to work for both extremes of the possible values of f. Since $f/f_z=1.219$ and $f_2/f=1.185$, the ratio of upper and lower frequency limits should not exceed 1.185, which is the smaller of the two ratios. For example, integral feedback will work with the frequency f' restricted to the interval from 558 Hz to 661 Hz, which corresponds to the temperature range from 15° C. to 130° C. Of course, other frequency ranges with the ratio 1.185 are possible with integral feedback. They can be made switch-selectable, and the user can choose the appropriate one based on prior experience or on an independent temperature measurement. The choice can also be made by a microcomputer that is suitably programmed to do this or, alternatively, to examine $A_{11}/A_{21} - 1$ as well as $\epsilon$ to find the correct operating point.

The range of frequencies f' over which the instrument will automatically seek the correct operating frequency f can easily be extended by the following technique. If the frequency f' is just less than $f_z$, the previously described integral feedback will cause f' to decrease quickly toward $f_y$, and similarly, if f' is just greater than $f_2$, it will quickly increase toward $f_3$. When f' reaches the new, more widely spaced frequency bounds on its way to $f_y$ or $f_3$, the instrument, in a preferred embodiment, will cause it to jump into a smaller range from which the integral feedback will bring it quickly to the correct operating frequency f.

Further explanation of this feedback technique requires considering numerical values for the frequencies involved. Since $f/f_y = 563/364 = 1.547$ and $f_3/f = 1015/563 = 1.803$, the new ratio of upper and lower frequencies should be 1.547 (1.547 being the smaller ratio). With this ratio, the frequency range could be enlarged, e.g., to the interval from 551 to 849 Hz, corresponding to the temperature range from 7° to 392° C. For this temperature range, the frequency f' should be constrained to the interval from 550 to 850 Hz and caused to hop to 698 Hz when it reaches 550 Hz and hop to 651 Hz when it reaches 850 Hz.

The choice of these numbers can be understood by examining the action of feedback at the temperature limits. For the upper temperature limit of 392° C. for which f=849 Hz, integral feedback causes f' to increase to 849 Hz whenever f' is initially greater than $(f_z/f) \times 849$ Hz = $849 \times 462/563$ Hz = 697 Hz. When f' is less than 697 Hz, it quickly decreases to 550 Hz, at which point the instrument causes it to hop to 698 Hz, and integral feedback takes it from there to 849 Hz. For the lower temperature limit of 7° C., for which f=551 Hz, integral feedback causes f' to decrease to 551 Hz whenever f' is initially less than $(f_z/f) \times 550$ Hz = $1.185 \times 550$ Hz = 652 Hz. When f' is greater than 652 Hz, it quickly increases to 850 Hz, at which point the instrument causes it to hop to 651 Hz, and integral feedback takes it from there to 551 Hz. In practice, the useful temperature range will be slightly smaller than 7° to 392° C. in order to prevent the frequency f' from hopping when noise causes it to fluctuate slightly from the operating point f. Of course, the instrument could be designed to operate over other temperature ranges by modifying the above numbers appropriately.

When the frequency $\omega/2\pi$ is a multiple of equation (8), the integral multiples of the wavelength will be equal to twice the microphone spacing. This condition is maintained regardless of flow velocity, temperature, speed of sound, etc. The ability to generate a specified wavelength sound regardless of physical changes in the surrounding is extremely useful.

Additionally, when the frequency $\omega/2\pi$ is a multiple of equation (8), the phase difference between the two microphone signals becomes:

$$\Delta\phi = \phi(D) - \phi(D + L) = \frac{\omega vL}{c^2 - v^2} \quad (11)$$

This is independent of the parameters R and D+1. The ratio of equation (7) is also independent of these parameters when $\omega/2\pi$ is a multiple of the frequency of equation (8), since then the ratio equals 1. This means that sound-reflecting objects outside the end of the tube within a few centimeters of its end will one change the phase differences and amplitude ratios at the operating frequency. This has been used to verify experimentally that the instrument is operating at the correct frequency. When it is, the performance of the instrument is not affected by the presence of objects near the open end of the tube.

Equation (11) is the basis for the flow measurement. This equation can be simplified using equation (8) so that, with $\Delta t = \Delta\phi/\omega$ the average Mach number $M = v/c$ is given by:

$$M = 2f\Delta t \quad (12)$$

which simplifies to $\Delta\phi/\pi$ for $\omega = 2\pi f$ and simplifies to $\Delta\phi/2\pi$ for $\omega = 2\pi 2f$. Thus, as long as equation (8) is satisfied, the average Mach number is just the phase difference in units of $\pi$ for frequency f and in units of $2\pi$ for frequency 2f. Also, the condition of equation (8) gives an expression for the average speed of sound:

$$c = \frac{2fL}{1 - 4f^2\Delta t^2} \quad (13)$$

Equation (12) can be combined with equation (13) to obtain an expression for the average velocity v as follows:

$$v = \frac{4f^2L\Delta t}{1 - 4f^2\Delta t^2} \quad (14)$$

When this is multiplied by the cross-sectional area a, it becomes the average volume flowrate $Q = av$. Thus, the speed of sound, the average velocity, and the average volume flow-rate are given in terms of just the operating frequency f, the time difference $\Delta t$ or equivalently the phase difference $\Delta\phi$, the distance L between the microphones and the cross-sectional area a, which can all be easily measured very accurately. These results are valid for an arbitrary fluid, i.e., a gas, a liquid, or a multiphase or multicomponent fluid.

If the fluid is restricted to be an approximately perfect gas or gas mixture, the gas density $\rho$ satisfies:

$$\rho = \gamma P/c^2 = \gamma P \left[ \frac{1 - 4f^2\Delta t^2}{2fL} \right]^2 \quad (15)$$

where $\gamma$ is the average ratio of specific heats of the gas, and P is the absolute pressure inside the meter tube. Also, the temperature T of the gas is given by:

$$T = \frac{mc^2}{\gamma K} = \frac{m}{\gamma K} \left[ \frac{2fL}{1 - 4f^2\Delta t^2} \right]^2 \quad (16)$$

where m is the average mass of a gas molecule and K is Boltzmann's constant. The mass flowrate $G = \rho Q$ can be obtained by multiplying equation (15) by equation (14) times a to get:

$$G = \gamma PA \frac{1 - 4f^2\Delta t^2}{L} \Delta t \quad (17)$$

All of the quantities on the right side of these equations can either be easily measured or looked up in readily available handbooks.

The mass flowrate sensitivity may be calculated for air flow in a 5 cm diameter pipe by inserting $\gamma=1.378$, L=30.5 cm, and P=101,325 Pa into equation (17) to get $\Delta t=1.07$ μs for 1 g/s flowrate. We arbitrarily choose to specify as the full scale flowrate that flowrate for which the average Mach number is 1/10. We do this because equation (14) is linear within 1% up to Mach 1/10. Also, up to that value, the velocity v used in the above equations will, within 1%, equal the average of the gas velocity over the cross section of the conduit. This is proved in the 1977 *Journal of the Acoustical Society of America* paper by Robertson entitled "Effect of Arbitrary Temperature and Flow Profiles on the Speed of Sound in a Pipe", Vol. 62, pp. 813–818 (1977). Still, the instrument will operate on flows with a Mach number nearly as large as 1 and give measured values as described by the above equations. With the above definition, equations (12) and (8) give $\Delta t=88.2$ μs or 82.4 g/s full scale at 20° C.

One percent resolution over a 10 to 1 mass flowrate range requires an 88 ns resolution in $\Delta t$. This requires that the two receiving means or microphones have a relative time delay (or phase shift) that is smaller than 88 ns. As seen in equation (19) in the 1977 *Review of Scientific Instruments* paper by Robertson and Potzick entitled "Synchronous Marker for Measuring Phase in the Presence of Noise", Vol. 48, pp. 1290–1294 (1977), this is aided by using microphones having a bandwidth at least $1/(2\pi 88 \text{ ns})=200$ kHz. This requirement can be relaxed somewhat if the phase shifts of the two microphones are very nearly equal.

Two types of sensors have been used for receiving means: a high quality ⅛ inch condenser microphone and a wide band quartz pressure transducer. Both have a band width of about 200 kHz. Even though the condenser microphone has approximately 100 times more sensitivity than the quartz transducer, they seem to work approximately equally well. The quartz transducer used is Model 112A23 manufactured by PCB Piezotronics, P.O. Box 33, Buffalo, N.Y. 14225. It has a noise level of 100 μV and a sensitivity of 50 mV/psi with a 2 μs rise time. The actual noise level for the particular transducers used is insignificant compared to the acoustic noise of a flowing gas, and so less expensive transducers with a higher noise level could be used.

The microphones are optionally mounted such that they minimally disturb the smoothness of the inside of the meter conduit in order to least affect the flow. In some embodiments, a rubber sleeve has been fitted over the microphone and the sleeved microphone simply plugged into a slightly tapered hole in the meter conduit much like a cork into a bottle. System adjustments are usually not necessary after removing and replacing a microphone mounted in this way. However, care must be taken to ensure that the mounting is air tight in order to prevent leakage and erroneous measurements.

Experiment has shown that high-pass filters at the microphone outputs with a cutoff frequency of about 100 Hz or 20% of f help reduce fluctuations in the mass flow indication due to low frequency noise, which is especially large at high gas temperatures. These filters may be just single pole filters, but they must be carefully matched in phase shift in order to avoid introducing a frequency-dependent error in the measurement of t as described by equation (19) of the above-mentioned 1977 *Review of Scientific Instruments* paper. This is important because, in view of the relation between the gas temperature and the correct operating frequency (as shown in equation (16)), such an error would lead to a temperature dependent offset in the flow indication.

In order for the instrument to be able to operate on a very noisy flow, the signals from the microphones must be filtered by extremely high-Q filters. These filters must not introduce a relative time delay as large as 88 ns even though the signal frequency changes over a broad range. Since the signal used to generate the sound wave can be used also as a reference, this filtering is best accomplished using a synchronous technique. A synchronous phase marker and amplitude detector (SPMAD) circuit as shown in FIG. 3 that meets these requirements is described in the 1981 *Review of Scientific Instruments* paper by Potzick and Robertson entitled "Voltage-Controlled Phase Shifter for Measuring Transfer Function in the Presence of Noise", Vol. 52, pp. 280–286 (1981). This circuit offers in effect an extremely high Q and in principle causes no phase shift. It provides a clean square wave output that accurately marks the phase of a sinusoidal signal that may be buried in noise by a large factor. The performance of a portion of this circuit is described in the 1977 *Review of Scientific Instruments* paper noted earlier. The same circuit also provides a voltage output that is proportional to the amplitude of the sine wave. Four of these circuits are used in the analog embodiment of the electronics for the present invention, one SPMAD for each microphone and each frequency.

In the FIG. 3 block diagram, the analog phase output voltage $v_\phi$ is fed back to the voltage-controlled phase shifter 30 causing it to shift the phase of the square wave $u(\omega t - \phi - \pi/2)$ until it is in quadrature with the signal that is obscured by the noise. The phase control voltage $v_\phi$ is obtained by integrating the product of the signal (plus noise), after amplification in wideband amplifier 28, and the shifted square wave $u(\omega t - \phi - \pi/2)$. This product appears at the output of the upper chopper 32 (sometimes referred to as a synchronous converter). That output averages to zero when the shifted square wave is in quadrature with the signal so that $v_\phi$ remains constant. This phase shifter 30 also has a second square wave output $u(\omega t - \phi)$, which is in quadrature with the first output. The desired time delay can be obtained by time-interval averaging measurements to the leading edges of the second square wave $u(\omega t - \phi)$. The amplitude output is obtained by multiplying the signal (plus noise) by the second shifted square wave $u(\omega t - \phi)$ in the lower chopper 34 and passing the result through a low pass amplifier 36.

SPMAD THEORY OF OPERATION

The phase shifter uses several of the ramp generator modules shown in FIG. 4. They generate a delay proportional to the phase control voltage $V\phi$. The ramp generator consists of a comparator 150, a passive pulse shaper, a transistor 152 acting as a switch, and an integrator 154. The input $V\phi$ is a nominally constant positive voltage, the input Vf is a nominally constant negative voltage, and Vo is a positive ramp output voltage that is generated when the input voltage Vi rises above V$\phi$. When the input reference voltage Vi rises above the nominally constant positive input voltage V$\phi$ the output of the comparator goes from low to high. The passive differentiator and clamping circuit changes this transition into a brief positive pulse. This pulse momentarily causes the transistor 152 to conduct and discharge the integrating capacitor 153. When the pulse decays to zero, the transistor no longer conducts, and the integrator 154 integrates the nominally constant (negative) input voltage Vt causing the output voltage Vo to rise from zero linearly with time. The time required for Vo to rise as high as V$\phi$ is RC V$\phi$|Vf|, where RC is the time constant of the integrator. This time is the delay generated by each module when they are cascaded.

Figure 5:
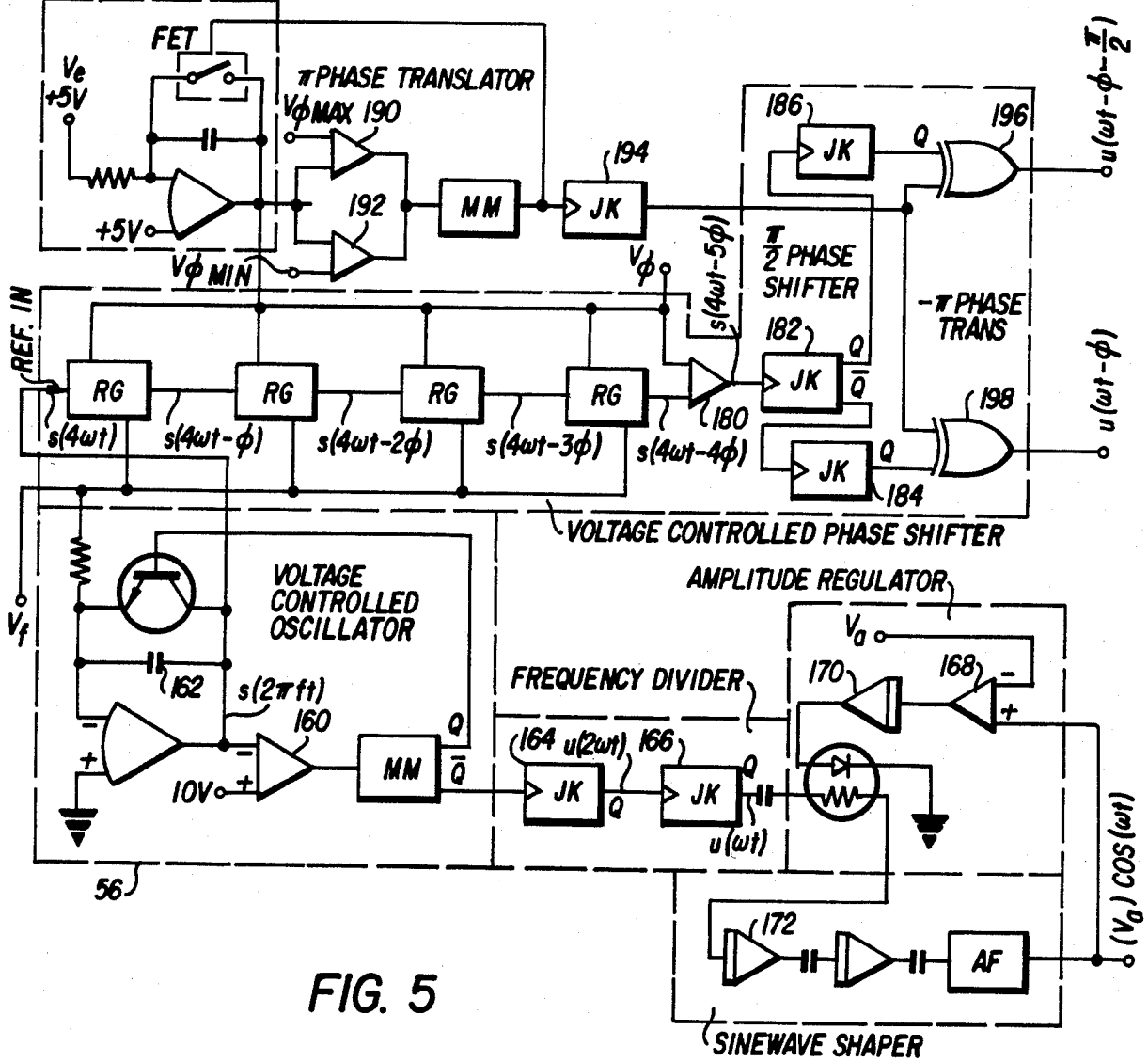
FIG. 5 is a detailed block diagram of a voltage-controlled oscillator, phase shifter, and associated circuits.

FIG. 5 is a block diagram for the oscillator and phase shifter. The frequency control voltage input Vf is nominally constant. The constant positive input voltage Va controls the amplitude of the sinusoidal output voltage Va cos (wt), which is used to drive speaker 18 in FIG. 1 of the two-port system. The error input Ve+5 V is obtained by adding 5 V to the synchronous phase marker loop error voltage Ve of FIG. 3. It consists of chopped signal plus noise fluctuating nominally about 5 V. The constant input voltages V max and V min are adjusted so that the TTL square wave outputs u(wt−$\phi$) and u(wt−$\phi$−$\pi$/2) do not change when the (normally nominally constant) phase output voltage V$\phi$ is caused to jump from V$\phi$ max down to 5 V or from V$\phi$ min up to 5 V. The nonstandard symbols used in this block diagram are as follows: RG denotes the ramp generator circuit of FIG. 4, MM denotes a monostable multivibrator, JK denotes a flip flop in toggle mode, AF denotes an active filter, and the switch is a FET analog switch, which is closed by a pulse from the monostable multivibrator.

The voltage-controlled oscillator 56 in the lower left corner of FIG. 5 is a relaxation oscillator similar to the circuit of FIG. 4 with its output connected to its input. When the negative integral of the nominally constant voltage Vf rises to ten V, the comparator 160 triggers the monostable multivibrator MM. The brief upward pulse at the Q output momentarily discharges the capacitor 162, thus resetting the integrator output to zero and then allowing the ramp to resume. This process repeats at a frequency $f=Vf/(10\ RC)$ over a thousand to one range in Vf, where RC is the time constant of the integrator, and Vf is measured in volts. The oscillator 56 thus produces two outputs: a 0–10 V sawtooth wave s(2$\pi$ft) at the integrator output, and a brief downward pulse at the $\overline{Q}$ output of the monostable multivibrator MM.

The pulse output clocks a JK flip flop 164 connected in the toggle mode, thus producing an exactly symmetric TTL square wave at one half the oscillator frequency. A second flip flop 166 (similarly connected) provides an additional division by two so its output has a frequency $$w/2\pi = f/4;$$

the second division by two is necessary because the $\pi$/2 phase shifter (to be described later) requires a second division and because all three outputs must be at the same frequency. The dc component of the TTL square wave output is removed, and the result is integrated once to produce a triangular wave, and once again to produce a parabolic approximation to a sine wave. The latter is filtered by an active filter AF to reduce harmonics in the output.

The peak amplitude of the sinusoidal output is controlled to equal the (usually constant) input voltage Va by the amplitude regulator feedback circuit 166 as follows. If the peak output momentarily exceeds Va, the comparator 168 inputs a positive current pulse to the integrator 170. The latter decreases the current through the diode, decreasing its light output, and thereby increasing the resistance of the photoresistor. This increases the time constant of the first sine shaping integrator 172, thereby decreasing the amplitude of the output. A small steady negative leakage current at the input of the feedback integrator 170 tends to increase the diode current and so keeps the peak of the sinewave up to the voltage Va. The resulting output voltage Va cos (wt), whose amplitude and frequency are controlled by the input voltages Va and Vf, is used to drive loudspeaker 18 of the two-port system.

The positive sawtooth output s(2$\pi$ft) of the relaxation oscillator is connected to the input of the phase shifter. When the rising voltage reaches V$\phi$, the output of the first ramp generator module RG is momentarily reset to zero and then resumes rising. A similar result occurs for each successive ramp generator module RG2, RG3, RG4, each stage adding a delay. Thus, assuming V$\phi$ is constant, all of the ramp generator modules also output a sawtooth wave of frequency f, each delayed from the previous one. Since each ramp generator module integrates the same voltage Vf with the same time constant, the slopes of all of the sawtooth waves are the same. As a result, the delay at each stage equals V$\phi$/(10f), where V$\phi$ is measured in volts, and the height of each saw tooth is 10 V. The maximum delay per stage is 1/f. Since the final output frequency w/2$\pi$ is to be one-fourth of the sawtooth frequency f, four delays are required to provide a $\pm\pi$ range for the phase shift of the output. An additional delay is required for a margin so that V$\phi$ will not ever have to be too near either zero or ten volts where the ramp generator modules do not work so well. Thus, four ramp generator modules are needed to add four delays to the one available from the oscillator's sawtooth output. The total phase shift of the f/4 output due to these five delays is $\Delta\phi=\pi V\phi/4$, independent of frequency, where V$\phi$ is measured in volts.

After the final stage of delay, the comparator 180 clocks a JK flip flop 182, whose Q and $\overline{Q}$ outputs as before are exactly symmetric TTL square waves of frequency f/2. Each output clocks another JF flip flop (184,186) which outputs a TTL square wave of frequency f/4. Since the first Q and $\overline{Q}$ outputs are of opposite phase, the second outputs differ in phase by $\pi$/2 (within about 10 ns or 0.0000314 rad at 500 Hz). These phase shifted outputs, u(wt−$\phi$) and u(wt−$\phi$−$\pi$/2), are used to drive the two choppers in FIG. 3; the previously mentioned exact symmetry of these outputs assures good rejection of even harmonics (including dc) by the circuit of FIG. 3.

The phase control voltage V$\phi$ is obtained by integrating the error voltage Ve at the upper left of FIG. 5. An adder (not shown) ahead of the integrator 38 adds five volts to Ve, and the difference between this sum and five volts is integrated. Thus, the output V$\phi$ of the integrator 38 is five volts when the capacitor is discharged. When, as a result of Ve differing from zero, V$\phi$ builds up to V$\phi$ max=nine volts or down to V$\phi$ min=one volt (corresponding to a change in phase shift of $\pm\pi$), the window comparators 190, 192 will trigger. This fires the monostable multivibrator MM, which resets the integrator 38 to five volts, causing a sudden phase jump of $\pi$ radians at the output of the JK flip flops 184, 186 last mentioned. At the same time the JK flip flop 194 following the monostable multivibrator changes state, causing a compensating phase inversion in the exclusive ORs 196, 198 at the output. The threshold levels V$\phi$ max and V$\phi$ min are adjusted to make these range change jumps imperceptible at the output. Thus the useful phase range of the phase shifter is unlimited, and even a frequency change can be achieved at the output by making Ve a constant proportional to the desired frequency change.

The upper chopper in FIG. 3 is from an (Evans Assoc.)EA4110 phase sensitive detector printed circuit board. In order to increase loop stability, the 0.47 $\mu$f low-pass filter capacitors in the chopper amplifier were replaced with 1500 pf capacitors, and the error signal Ve was taken from this amplifier, thus by-passing subsequent low-pass filter on the EA4110 board.

An important disadvantage in using a chopper is that the synchronous marker is sensitive to odd harmonics of the signal. This could be eliminated by replacing the chopper with a multiplier that multiplies the signal (plus noise) by the sinewave $\cos(wt-\phi)$. However, no multiplier could be found that had 200 kHz bandwidth and also had as small a noise feed through as the EA 4110; the noise feed through for the EA4110 chopper was 20 $\log_{10}$ (Gs/Gn)=90 db, where Gn/Vn~Vo in Eq. (21) of the above-mentioned 1977 Review of Scientific Instruments paper. This small noise feed through is essential for meeting the 0.0025 rad phase-accuracy requirement. So the approach used here to to avoid the sensitivity to odd harmonics by not generating them in the first place.

Since the bandwidth and noise feedthrough requirements of the amplitude detector chopper (at the bottom of FIG. 3) are not as stringent as for the phase detector chopper (at the top of FIG. 3), an operational amplifier and FET analog switch chopper were used for the former. It multiplies the signal (plus noise) by the square wave $u(wt-\phi)$ whose dc component was removed.

Increasing the time constant of the integrator 38 (or decreasing the gain in the rest of the loop) decreases the time jitter in the phase marker output $\phi$ while it slows the response time of that output as described in the 1977 *Review of Scientific Instruments* article. Narrowing the bandwidth of the low pass amplitude amplifier decreases the noise at the amplitude output while also slowing its response time. Thus, the noise on the amplitude A and phase $\Phi$ outputs can be decreased as much as desired, at the expense of increased response time, so that the transfer function of a two-port system can be accurately measured even in the presence of noise much larger than the signal.

In order to avoid phase shift errors, it is often best to use two of the synchronous phase marker and amplitude detector circuits, one to determine the amplitude and phase of the signal applied to the input port, and one for the signal observed at the output port. This is desirable in the long wavelength acoustic flowmeter where, because of temperature nonuniformity, there is an uncontrollable amplitude and phase change between the loudspeaker and the system being measured. To avoid this problem, two microphones and two marker/detector circuits are used, one measuring the input to the two-port system and one measuring the response at the output. The transfer function is then given by the ratio of amplitudes obtained from the two amplitude outputs and by the phase difference measured by time-interval averaging between the leading edges of the two phase marker outputs.

Figure 6:
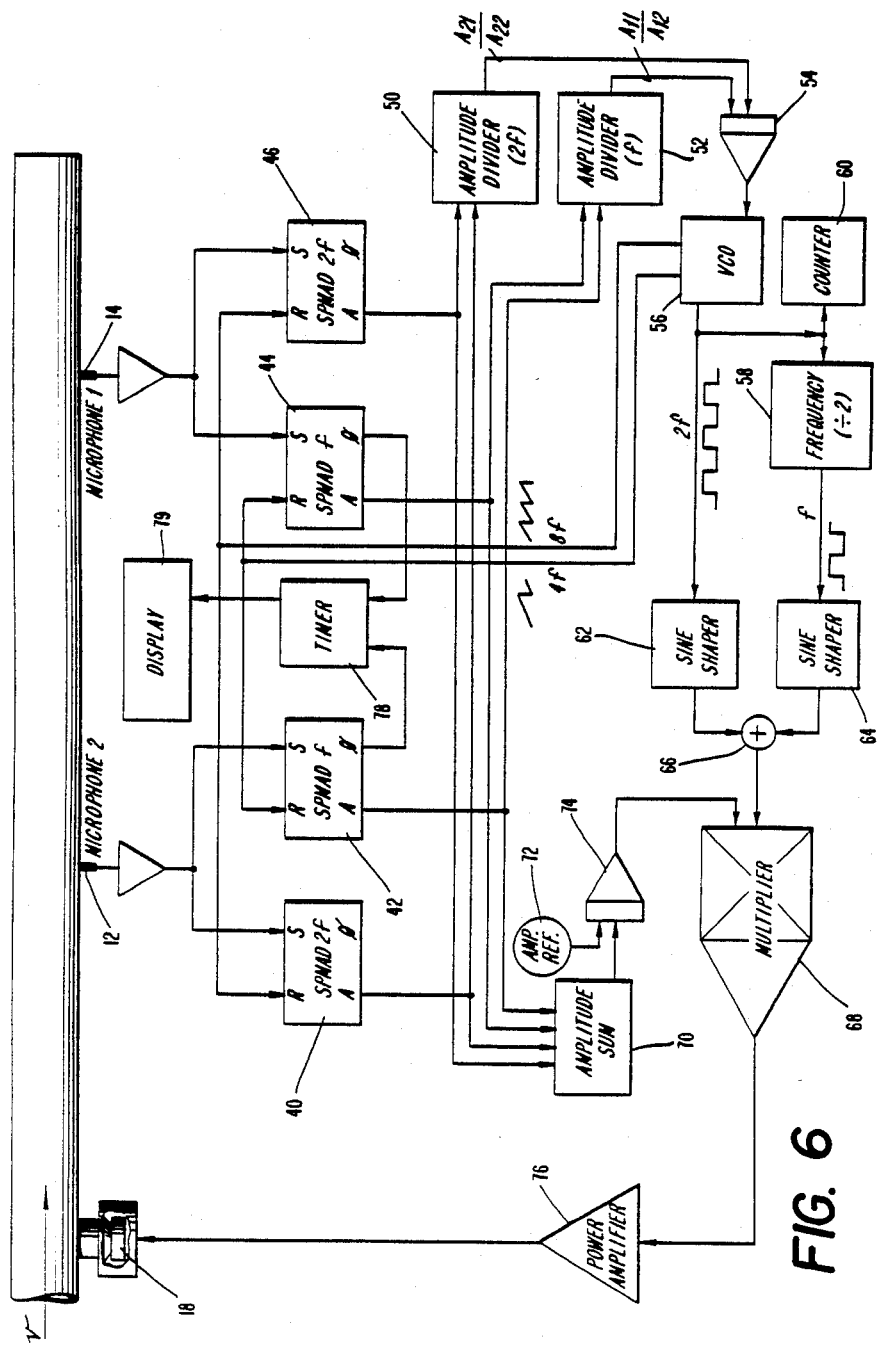
FIG. 6 is a block diagram of the electronic circuit used in an analog embodiment of the present invention.

The block diagram of this analog embodiment of the acoustic flowmeter is shown in FIG. 6. The outputs of microphones 1 and 2 are amplified and applied to the signal inputs of the SPMAD's 44 and 46, and 40 and 42, respectively. The amplitude outputs from SPMAD's 46 and 40, representing the amplitude at frequency 2f from microphones 1 and 2, are connected to the inputs of the 2f amplitude divider 50. The output of this divider is the ratio $A_{12}/A_{22}$.

Similarly, the amplitude outputs from SPMAD's 44 and 42 are connected to the amplitude divider 52 for frequency f. The output of this divider is the ratio $A_1/A_{21}$. The difference between these ratios is integrated by the integrator 54 and fed to the voltage-controlled oscillator (VCO) 56 to keep the frequency at the correct operating point given by equation (8). The 2f square wave output of the VCO 56 is connected to a frequency divider 58, with an 8f ramp output to the reference inputs of the SPMAD's 40 and 46. The 2f square wave may also be connected to a frequency or period counter 60, whose indication may be used for obtaining the average temperature from equation (16). The 4f ramp output of the VCO 56 is connected to the reference inputs of the SPMAD's 42 and 44. The 2f square wave output of the VCO 56 and the f square wave output of the frequency divider 58 are also connected to the sine shapers 62 and 64. Each sine shaper removes the DC level from the input TTL square wave, integrates the result to get a symmetric triangle wave, integrates the latter to get a symmetric parabolic wave, and band-pass filters the parabolic wave to get a sine wave. Since the amplitude of this sine wave would otherwise depend strongly on frequency, the sine shapers have a feedback controlled gain that maintains constant output amplitude. The sine shaper outputs are combined in the adder 66 and supplied as one input to the multiplier 68 that is used for control of the sound amplitude.

The amplitude outputs of the SPMAD's 40 through 46 are also connected to an amplitude summer 70, which computes an average amplitude to be compared with the amplitude reference 72. This comparison is done in the differential integrator 74, whose output is connected to one input of the multiplier 68 used for amplitude control. The output of this amplitude multiplier 68 is connected to the power amplifier 76, which drives the loudspeaker 18. Thus, the sine shapers 62 and 64 and the adder 66 supply the signal that is a superposition of sine waves at frequencies f and 2f. The amplitudes of these sinusoids are controlled so that the amplitude dividers operate at typically 80% of full scale. The phase marker outputs $\phi$ from the SPMAD's 42 and 44 are compared in the time-interval averaging counter 78, which give $\Delta t$ for use in equation (17) to obtain the mass flow rate.

The means for insuring that the spacing L is an integral multiple of a half wavelength of f in FIG. 6 is the amplitude outputs of SPMAD's 40, 42, 44 and 46, amplitude dividers 50 and 52, integrator 54, VCO 56, divider 58 and sine shapers 62 and 64. In FIG. 4, the means for measuring the phase difference comprises the SPMAD's 42 and 44 and the timer 78 and the means for indicating at least one parameter (in a preferred embodiment, mass flow rate) is display 79.

Figure 7:
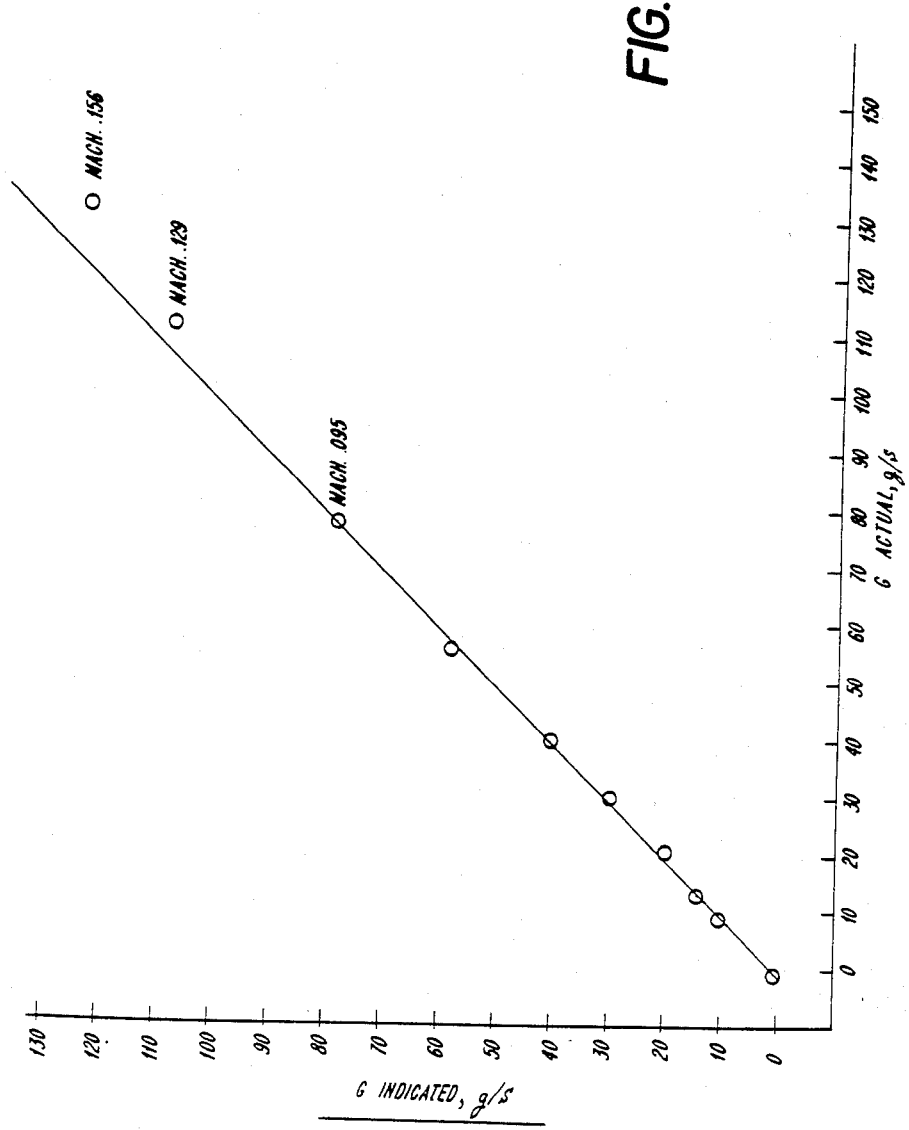
FIG. 7 is a graph of the mass flowrate indication of the analog embodiment of the present invention versus the actual mass flowrate.

The meter-tube embodiment of FIG. 1 wit the analog-electronics embodiment of FIG. 6 was tested on the National Bureau of Standards (NBS) air flow calibration facilities. The results are shown in FIG. 7. Here, the actual mass flowrate G actual was measured using NBS transfer-standard sonic nozzles. The indicated mass flowrate G indicated was calculated from equation (17) using measured and handbook values for the quantities on the right. The straight line is the result of a least square fit to the data below full scale at Mach 1/10. The slope of this line is within 0.1 percent of the expected value of 1, but there was an offset of 0.681 g/s, which is about 8% of full scale and 0.8% of Mach 1. The two data points above Mach 0.1 fell below the line, most likely because of a temperature dependence to the offset. The temperature of the air flow decreased from room temperature at the lower flowrates to 0° C. at the highest flowrate.

The temperature dependent offset in the flow indication has been observed directly in a number of tests, in which the flowing air was heated up to 130° C. while the actual mass flowrate was held constant. The offset was less than 10% of full scale and depended on temperature history. Some of this offset was shown to be associated with the microphones themselves by interchanging them with each other and with spares. Part of the flow indication offset that is associated with the microphones may be due to a strong temperature dependence of the resistance of the quartz transducer itself, and part may be due to the follower amplifier attached to the transducer. At room temperature, the quartz transducer with its attached MOSFET amplifier, insulating potting, and teflon insulation have a resistance of about 50,000 megohms and a capacitance of about 20 pf. This gives a 1 second time constant and, according to equation (19) of the 1977 *Review of Scientific Instruments* paper, a time shift of 80 ns at 563 Hz. At 100° C., the resistance of the quartz will be about a factor of 5 lower, so the time constant will be 1/5 second or shorter. The resulting time shift will increase to approximately 400 ns or more at the operating frequency. Since this time shift leads to an offset in the flow indication, this explained some of the observed temperature dependent offset.

The time shift cannot be eliminated by using a filter to narrow the bandwidth, e.g., by using the previously mentioned high-pass filter with a 100 Hz corner. This follows since the phase shifts due to cascaded filters are additive even if their corner frequencies are widely separated. One possibility of correcting this time shift is to use an amplifier with 200 pf capacitance to decrease the phase shift. The amplifier can also be separated from the transducer so that the amplifier will remain at room temperature.

Figure 8:
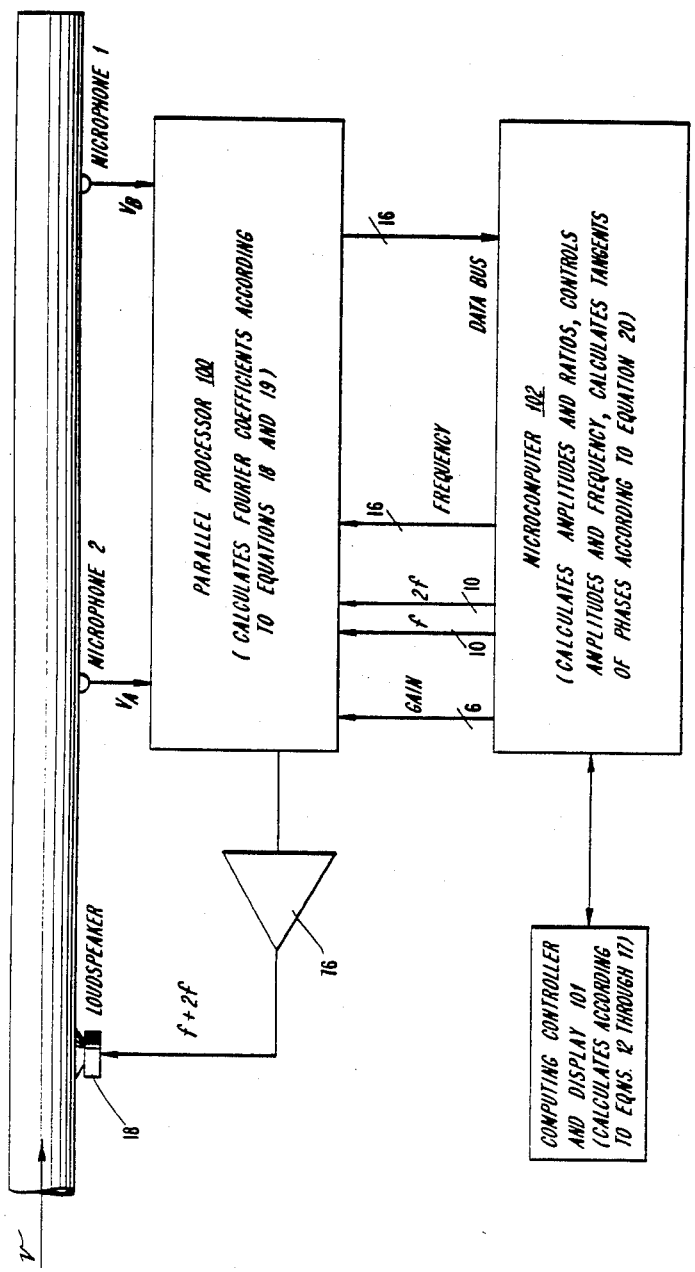
FIG. 8 is a functional block diagram of a digital embodiment of the acoustic flowmeter in accordance with the present invention.
Figure 9:
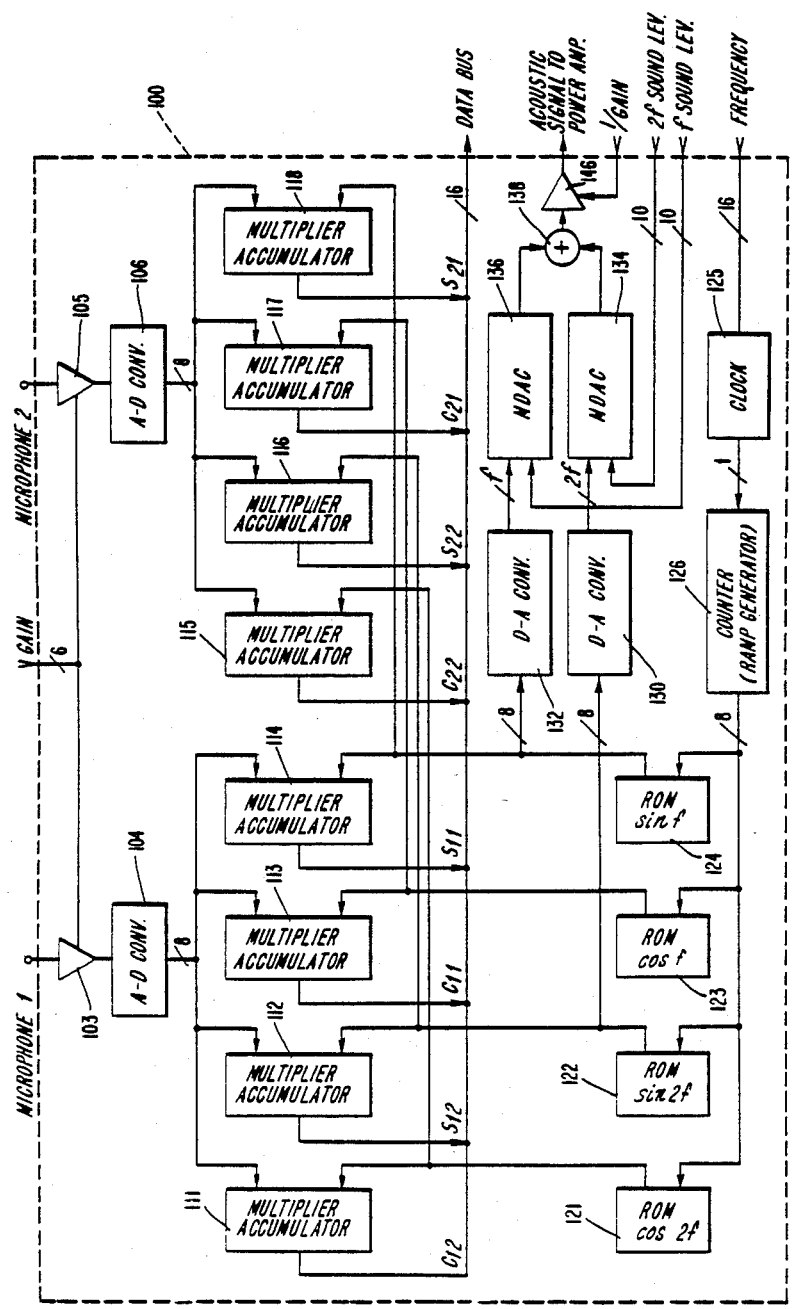
FIG. 9 is a detailed block diagram of the parallel processor used in a digital embodiment of the present invention.

Another possible cause for flow indication offset, although not associated with the temperature of the flowing gas, is some drifting in the analog circuitry. This decreases the repeatability of the flow indication, especially when the instrument is first turned on. A digital embodiment of the electronics has been designed in an effort to reduce this drifting. This embodiment, as shown in the FIG. 8 block diagram, comprises a parallel processor 100 and a microcomputer 102 programmed in ROM and connected to a computing controller and display 101 for computation and display. The parallel processor 100 is a specially designed high-speed processor that is desirable because part of the processing must be done at a much greater speed than is presently possible with a microcomputer alone. The microcomputer 102 is used in order to simplify development of the remainder of the processing, which does not need particularly high speed, and to retain flexibility for making minor design changes.

The parallel processor simultaneously computes eight Fourier coefficients of the sound signal, one sine and one cosine coefficient for each microphone and each frequency. If we revert for the moment to the single frequency description used previously, the signal from the microphone at location x is given as before by equation (4). The Fourier coefficients then are given by:

$$C(x) = \frac{1}{\pi} \int_0^{2\pi} V \cos(\omega t) \, d(\omega t) = A(x) \cos\phi(x) \quad (18)$$

$$S(x) = \frac{-1}{\pi} \int_0^{2\pi} V \sin(\omega t) \, d(\omega t) = A(x) \sin\phi(x) \quad (19)$$

The computation of these Fourier coefficients discriminates effectively against all of the harmonics of the frequency $\omega/2\pi$ as well as against broadband noise. This has an important advantage in comparison with the SPMAD's, which discriminate only against the even harmonics, although the SPMAD's do discriminate effectively against nonharmonic pure tones and broadband noise.

The values of the Fourier coefficients are fed to the microcomputer on interrupt every acoustic period, which is in the range from 1.8 to 1.4 ms depending on the frequency (which is a function of the temperature). The microcomputer uses the coefficients to compute the squares of the amplitudes of the four sine waves, one for each microphone and each frequency, and uses the squares of the amplitudes to set the sound level at each frequency. It computes the difference between the squares of the ratio (equation 7)) for frequencies f and 2f. This is approximately twice the error signal in equation (9), as described previously. The microcomputer uses this difference, summed over many sound periods, to set the frequency to the operating point. When the frequency is set correctly, the microcomputer computes the tangent of the phase difference at each frequency. Once again let subscripts denote the downstream and upstream microphones and the frequencies f and 2f, respectively. Trigonometric identities can be used to express the phase difference in terms of the Fourier coefficients are:

$$\tan(\Delta\phi_i) = \frac{C_{2i}S_{1i} - S_{2i}C_{1i}}{C_{2i}C_{1i} + S_{2i}S_{1i}}, \quad i = 1, 2 \quad (20)$$

The microcomputer uses this expression to compute the tangent of the phase once every acoustic period.

In a preferred embodiment, the instrument contains an arctangent lookup table in read-only memory (ROM) so that the microcomputer can average the phase itself rather than the tangent of the phase. This adds considerable expense but offers increased accuracy for flow velocities with large fluctuations and Mach numbers larger than 1/10. Alternatively, the microcomputer could compute the arctangent, but for presently available hardware, this would take too much time, and data would have to be ignored in order to average the phase rather than its tangent. The reduced ability to discriminate against noise while performing real-time measurements makes this alternative less desirable. For Mach numbers less than the full scale 1/10, the distinction between the phase and its tangent is less important, especially for reasonably steady flows. Thus, in one embodiment, the microcomputer averages the tangent of the phase and transmits it to the computing controller and display 101 for computation and display of the resulting flowrates.

A block diagram of a preferred embodiment of the parallel processor is shown in FIG. 7. The parallel processor 100 has a clock 125 whose frequency is controlled by an input from the microcomputer to operate at 256 times the operating frequency f. The clock pulses are counted by the counter 126 to obtain an 8-bit up-ramp or sawtooth wave. This saw-tooth output is connected to the 8-bit address inputs of the ROM's 121 through 124, which contain one or two cycles of the cosine or sine functions, accurate to 8 bits. The 8-bit data outputs of these ROM's are 127 cos $(2\pi 2n/256)$, 127 sin $(2\pi 2n/256)$, 127 cos $(2\pi n/256)$, and 127 sin $(2\pi n/256)$, respectively, rounded to the nearest integer, where n is an integer that is incremented by 1 at a rate 256 times f. These data outputs are connected to one input of the multiplier/accumulators 111 through 114 and also 115 through 118, respectively. The sine 2f and sin f outputs of ROM's 122 and 124, respectively, are also connected to the 8-bit digital-to-analog converters (DAC's) 130 and 132, respectively. The approximately sinusoidal voltage outputs at frequencies 2f and f of these DAC's are filtered to remove the 256 steps and then connected to the inputs of the multiplying digital-to-analog converters (MDAC's) 134 and 136, respectively. These MDAC's multiply the sinusoids by a voltage specified by the 10-bit input to the MDAC's, and the resulting output is a sinusoid whose amplitude is proportional to that factor. This 10-bit digital input is supplied by the microcomputer to maintain the sound amplitude for each frequency at a preset level. The two sinusoidal voltages are added in the summer 138 and their sum is amplified in the amplifier 146 and the power amplifier 76 and supplied to the loudspeaker 18 as in the analog embodiment.

The resulting signals from the microphones 1 and 2 are amplified by the amplifiers 103 and 105. Both these amplifiers and the amplifier 146 have their gains controlled by the microcomputer over the range from 1 to 128 in powers of 2. The digital input to the amplifier 146 is wired inversely to the digital inputs to the amplifiers 103 and 105 so that, when the sound level is increased by a factor of 2, the microphone gain will simultaneously be decreased by a factor of 2, and the signal level at the output of the amplifiers 103 and 105 will remain constant. Since increasing the sound level increases the signal-to-noise ratio, this digital input is, in effect, a signal-to-noise control.

The signals from the amplifiers 103 and 105 are converted to 8-bit digital amplitudes at a rate equal to 256 f in the analog-to-digital converters (ADC's) 104 and 106, respectively. The 8-bit outputs of these ADC's are connected to one of the inputs of the multiplier/accumulators 111 through 114 and 115 through 118, respectively. The multiplier/accumulators used in the preferred embodiment are TRW 1009J 12-bit by 12-bit multipliers with 27-bit accumulators and tristate outputs and are available from TRW LSI Products Division of TRW, Inc., P.O. Box 1125, Redondo Beach, CA 90278. The accumulators are set to zero at the start of an acoustic period. The Fourier coefficients are available at the outputs of the accumulators at the end of the acoustic period. The 16 most significant bits of these outputs are fed to the microcomputer on its 16-bit data bus, on non-vectored interrupt, at the end of the period. Detailed wiring for the interrupt generation, the data register addressing, and the triggering of the ADC's, the DAC's, the multipliers, the registers, and the accumulator and counter resetting has been omitted from FIG. 7 for clarity. These details are easily supplied by one of ordinary skill in the art.

The microcomputer used must be able to carry out 16-bit multiplications and divisions sufficiently rapidly that all the indicated computations can be completed in the approximately 1.4 ms minimum period of the fundamental sound wave and have enough time left over to handle data I/O and other overhead tasks. This is required so that no available data will be lost and the time averages will include the largest possible number of terms in the shortest time. This makes the instrument better able to discriminate against high-level noise and compute the average of measured quantities that may have relatively large random fluctuations and yet be able to output the measured values in almost real time. The microcomputer used in a preferred embodiment is the AmZ8000 Evaluation Board manufactured by Advanced Micro Computor Devices at 901 Thompson Place, Sunnyvale, CA 94086. Since a RS232C cable is used to connect this microcomputer to its console, any dumb terminal or, alternatively, another computer, if suitably programmed, can be used for control of the flow-meter and display of its output.

For either the analog or digital embodiment, the response time of the instrument to a step change in flowrate or temperature is ultimately limited by the transit time of the step between the two receivers and by the sampling rate, which is once per acoustic period. For the dimensions used in the embodiment of FIG. 1, both are about one millisecond. Another possible limitation is the response time of the narrow-banding SPMAD's in the analog embodiment or the averaging in the digital embodiment that discriminates against noise. Another limitation is the response time of the feedback loop that adjusts the frequency to satisfy the condition of equation (8) and of the loop that controls the amplitude of the sound. For flows associated with a high noise level, the response time of the whole instrument will be made greater than the above minimum by the narrow banding, the averaging, or the loops.

As has been noted earlier, the generator of sound at a specified wavelength may be desirable in applications other than the acoustic flowmeter discussed here. Furthermore, the synchronous phase marker and amplitude detector may be useful in applications other than the acoustic flowmeter where it is desirable to measure the phase and amplitude of a signal which is obscured by high noise levels. The acoustic flowmeter does not necessarily have to have a specific wavelength sound generator and, instead, could adjust the receiver means spacing in order to maintain their spacing equal to an integral multiple of half wavelengths of whatever frequency is generated. The analog embodiment feedback to the VCO could just as easily be utilized to control the microphone spacing by moving two telescoping tubes relative to each other, each tube having one microphone therein.

The performance of the phase marker part of the circuit of FIG. 3 is the same as it was using the limited delay circuit described previously in the 1977 *Review of*

*Scientific Instruments* paper except that now an unlimited phase shift can be followed. In addition, the circuit now has an output $V\phi$ proportional to the phase shift modulo $2\pi$ and an output A proportional to the amplitude of the signal that is buried in noise. The frequency of the oscillator is proportional to the control voltage Vf, and the amplitude of the sinusoidal output is proportional to the control voltage Va. Thus, the new circuit achieves substantial improvement over the previous one.

Although the invention has been described relative to specific embodiments thereof, it is not so limited. Many modifications and variations will be readily apparent to those skilled in the art in the light of the foregoing disclosure, and the invention may be practiced otherwise than has been specifically described.

Embodiments of the invention in which an exclusive property or privilege is claimed are defined as follows:

1. A synchronous phase marker and amplitude detector for determining the relative amplitude and phase of a periodic signal obscured by noise with respect to a known reference signal, said detector comprising:
   a first chopper having a signal input connected to the signal obscured by noise, a reference input and an output;
   means for integrating the output of said first chopper;
   variable phase shifting means, responsive to said integrating means output, for shifting the phase of said reference signal, and phase shifted reference signal connected to said first chopper reference input; and
   a second chopper having a signal input connected to said signal obscured by noise, a reference input and an output, said variable phase shifting means having a further output with the phase shifted reference signal shifted an additional (n×90) degrees, where n is equal to any odd integer, said further output connected to said second chopper reference input, said further output comprising said required phase information and said second chopper output providing said obscured signal amplitude information.

2. A synchronous phase marker and amplitude detector for determining the amplitude and relative phase of a periodic signal obscured by noise $V_s \cos(wt-\phi)+V_n(t)$ with respect to a known reference signal Vi of the same frequency, said detector comprising:
   a first chopper having as an input said signal obscured by noise $V_s \cos(wt-\phi)+V_n(t)$, a reference input $u(wt-\phi-\pi/2)$ and an output Ve;
   means for integrating said first chopper output Ve and providing an integrated output $V\phi$;
   variable phase shifting means, responsive to said integrating means output $V\phi$, for shifting the phase of said reference signal Vi, wherein one phase shifted reference signal $u(wt-\phi-\pi/2)$ is connected to said first chopper reference input and a further phase shifted reference signal $u(wt-\phi)$ is provided; and
   a second chopper having a signal input connected to said signal obscured by noise $V_s \cos(wt-\phi)+V_n(t)$, said further phase shifted reference signal $u(wt-\phi)$ as an input, and an output, where said further phase shifted reference signal $u(wt-\phi)$ is shifted an additional $N\times 90°$ with respect to the phase shifted reference signal $u(wt-\phi-\pi/2)$, wherein N is equal to any odd integer, said further phase shifted reference signal comprising said required phase information and said second chopper output comprising said obscured signal amplitude information.

3. The synchronous phase marker amplitude detector in accordance with claim 2, further including:
   a wide band amplifier which is supplied with the signal obscured by noise $V_s \cos(wt-\phi)+V_n(t)$ and whose output is supplied as a signal input to the first and second choppers; and
   a low pass amplifier whose input is connected to the second chopper output, said low pass amplifier output A proportional to the amplitude of the signal buried in noise.

* * * * *